US012703106B2

(12) United States Patent
Shimizu

(10) Patent No.: US 12,703,106 B2
(45) Date of Patent: Aug. 11, 2026

(54) SUBSTRATE HOLDING HAND AND SUBSTRATE CONVEYING ROBOT

(71) Applicant: KAWASAKI JUKOGYO KABUSHIKI KAISHA, Kobe (JP)

(72) Inventor: Ippei Shimizu, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 831 days.

(21) Appl. No.: 18/024,530

(22) PCT Filed: Nov. 2, 2020

(86) PCT No.: PCT/JP2020/041029
§ 371 (c)(1),
(2) Date: Mar. 3, 2023

(87) PCT Pub. No.: WO2022/049786
PCT Pub. Date: Mar. 10, 2022

(65) Prior Publication Data

US 2023/0311334 A1 Oct. 5, 2023

(30) Foreign Application Priority Data

Sep. 3, 2020 (JP) ................................ 2020-148493

(51) Int. Cl.
*B25J 11/00* (2006.01)
*B25J 15/00* (2006.01)

(52) U.S. Cl.
CPC ....... *B25J 11/0095* (2013.01); *B25J 15/0028* (2013.01); *B25J 15/0052* (2013.01)

(58) Field of Classification Search
CPC ................ B25J 11/0095; B25J 15/0028; B25J 15/0052; B25J 9/1633
USPC .............................................. 294/213, 103.1
See application file for complete search history.

(56) References Cited

U.S. PATENT DOCUMENTS 5,566,466 A * 10/1996 Hearne ............... H10P 72/7608 198/379
6,216,883 B1 * 4/2001 Kobayashi .......... H10P 72/7602 211/41.18
6,283,701 B1 * 9/2001 Sundar ................ H10P 72/7602 414/744.5
7,140,655 B2 * 11/2006 Kesil ...................... B25J 9/1633 414/941
7,226,269 B2 * 6/2007 Sundar ................ H10P 72/7602 901/6
12,438,027 B2 * 10/2025 Kim .................... H10P 72/0458
2004/0102858 A1 * 5/2004 Kesil ...................... B25J 9/1633 700/11
2011/0187140 A1 * 8/2011 Hashimoto .............. B25J 15/00 294/103.1

(Continued)

FOREIGN PATENT DOCUMENTS

CN 102751228 A 10/2012
JP H09-213768 A 8/1997

(Continued)

*Primary Examiner* — Paul T Chin
(74) *Attorney, Agent, or Firm* — Oliff PLC

(57) ABSTRACT

A substrate holding hand includes a blade including a support to support a substrate, a movable pressing unit including a pressing member that moves back and forth to press the substrate, and an inclination adjusting mechanism operable to adjust an inclination of the pressing member.

7 Claims, 8 Drawing Sheets

(56) References Cited

U.S. PATENT DOCUMENTS

| | | | | |
|---|---|---|---|---|
| 2011/0243690 | A1 | 10/2011 | Furuichi | |
| 2021/0354311 | A1 | 11/2021 | Fukushima et al. | |
| 2022/0093444 | A1* | 3/2022 | Kuribayashi | ....... H10P 72/7602 |

FOREIGN PATENT DOCUMENTS

| | | | |
|---|---|---|---|
| JP | 2011-228625 | A | 11/2011 |
| JP | 2013-069914 | A | 4/2013 |
| TW | 202026120 | A | 7/2020 |

* cited by examiner 1
31
31a
311
311
W
W
L1

31c
32
33
38
312
312
31b
37
37
35
35
36
36
34
34
Z
Z2
Z1
Y1
Y2
Y
X1
X2
X 32b
322
34
34b
35b 35b
32
34b C1
321
321b
34a
32c
C2
35
35a 32a
X
X1
X2
Z1
Z2
Z
Y2
Y1
Y

SUBSTRATE HOLDING HAND AND SUBSTRATE CONVEYING ROBOT

TECHNICAL FIELD

The present invention relates to a substrate holding hand and a substrate conveying robot, and relates to a substrate holding hand and a substrate conveying robot each including a movable pressing unit.

BACKGROUND ART

Conventionally, a substrate holding hand including a movable pressing unit is known. Such a hand is disclosed in Japanese Patent Laid-Open No. 2013-069914, for example.

Japanese Patent Laid-Open No. 2013-069914 discloses a substrate conveying hand (substrate holding hand) to convey a substrate. This substrate conveying hand includes a movable pressing unit including a pressing portion that moves back and forth to press the substrate.

Although not clearly described in Japanese Patent Laid-Open No. 2013-069914, in a conventional substrate conveying hand as described in Japanese Patent Laid-Open No. 2013-069914, a pressing portion is conceivably provided to press a substrate arranged at a design position.

PRIOR ART

Patent Document

Patent Document 1: Japanese Patent Laid-Open No. 2013-069914

SUMMARY OF THE INVENTION

Problems to be Solved by the Invention

In the conventional substrate conveying hand, it is difficult for the pressing portion to press the substrate in accordance with the actual position of the substrate when the actual position of the substrate to be pressed by the pressing portion deviates from an originally assumed design position. That is, it is difficult for the pressing portion (pressing member) to appropriately press the actual substrate.

The present invention aims to provide a substrate holding hand and a substrate conveying robot each capable of appropriately pressing a substrate with a pressing member even when the actual position of the substrate to be pressed by the pressing member deviates from an originally assumed design position.

Means for Solving the Problems

A substrate holding hand according to a first aspect of the present invention includes a blade including a support to support a substrate, a movable pressing unit including a pressing member that moves back and forth to press the substrate, and an inclination adjusting mechanism operable to adjust an inclination of the pressing member.

A substrate conveying robot according to a second aspect of the present invention includes a substrate holding hand, and an arm to move the substrate holding hand. The substrate holding hand includes a blade including a support to support a substrate, a movable pressing unit including a pressing member that moves back and forth to press the substrate, and an inclination adjusting mechanism operable to adjust an inclination of the pressing member.

Effect of the Invention

According to the present invention, as described above, the inclination adjusting mechanism is provided to adjust the inclination of the pressing member such that the inclination of the pressing member can be adjusted to an appropriate inclination according to the actual position of the substrate to be pressed by the pressing member, and thus even when the actual position of the substrate to be pressed by the pressing member deviates from an originally assumed design position, the pressing member can appropriately press the substrate.

MODES FOR CARRYING OUT THE INVENTION

An embodiment embodying the present invention is hereinafter described on the basis of the drawings.

The configuration of a substrate conveying robot 100 according to this embodiment is now described with reference to FIGS. 1 to 12.

Figure 1:
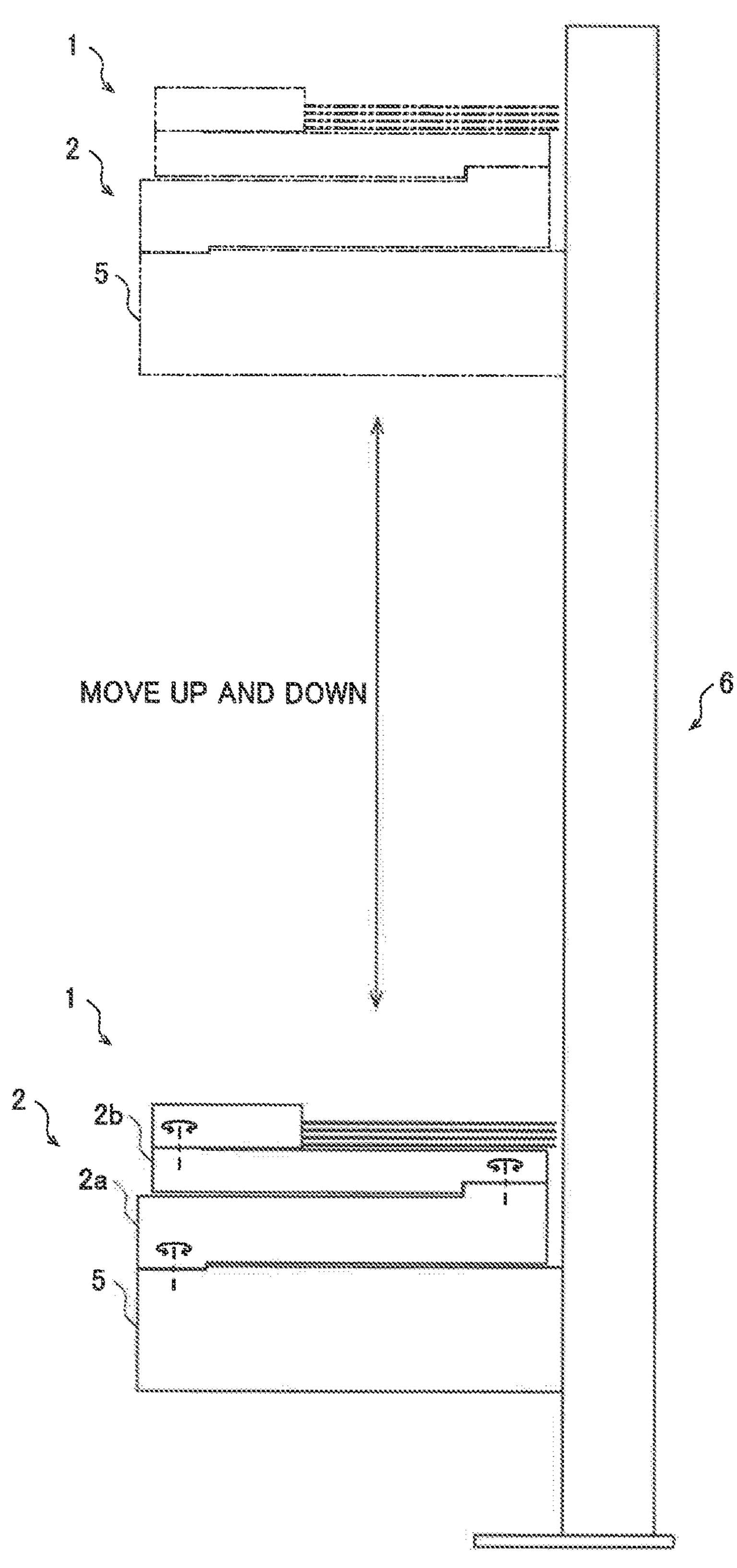
FIG. 1 is a diagram showing the configuration of a substrate conveying robot according to an embodiment of the present invention.

As shown in FIG. 1, the substrate conveying robot 100 includes a substrate holding hand 1 and an arm 2 that moves the substrate holding hand 1. As shown in FIGS. 2 to 12, the substrate holding hand 1 includes blades 31 including supports 311 and 312 to support substrates W, a movable pressing unit 32 (33) including pressing members 32*a* (33*a*) that move back and forth to press the substrates (semiconductor wafers) W, and inclination adjusting mechanisms 34 and 35 (36 and 37) to adjust the inclinations of the pressing members 32*a*.

According to this embodiment, as described above, the inclination adjusting mechanisms 34 and 35 (36 and 37) are provided to adjust the inclinations of the pressing members 32*a* (33*a*) such that the inclinations of the pressing members 32*a* (33*a*) can be adjusted to appropriate inclinations according to the actual positions of the substrates W to be pressed by the pressing members 32*a* (33*a*), and thus even when the actual positions of the substrates W to be pressed by the pressing members 32*a* (33*a*) deviate from originally assumed design positions, the pressing members 32*a* (33*a*) can appropriately press the substrates W.

The substrate holding hand 1 includes the blades 31, the movable pressing units 32 and 33, and the inclination adjusting mechanisms 34, 35, 36, and 37, as shown in FIGS. 2 to 9.

Figure 6A:
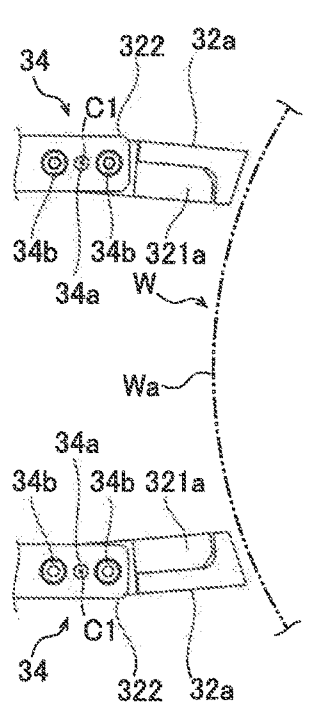
FIGS. 6A and 6B are diagrams for illustrating adjustment of the inclinations of pressing members of the first movable pressing unit of the substrate holding hand in an X-Y plane according to the embodiment of the present invention.
Figure 6B:
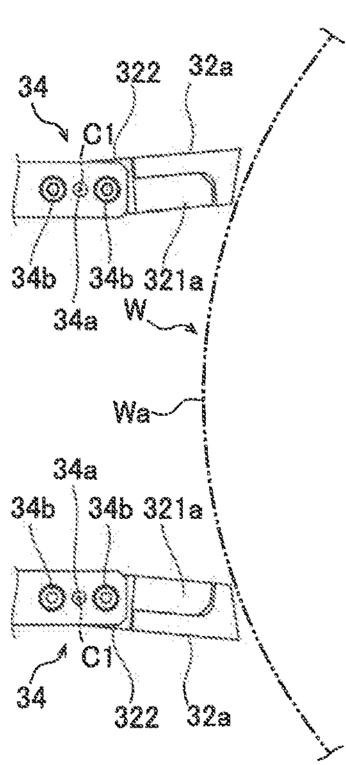
Figure 7A:
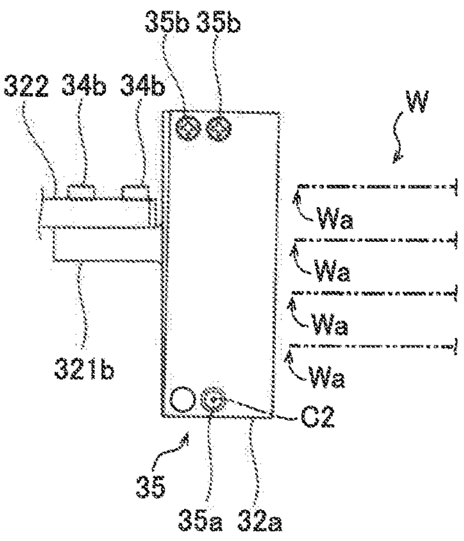
FIGS. 7A and 7B are diagrams for illustrating adjustment of the inclinations of the pressing members of the first movable pressing unit of the substrate holding hand in a Y-Z plane according to the embodiment of the present invention.
Figure 7B:
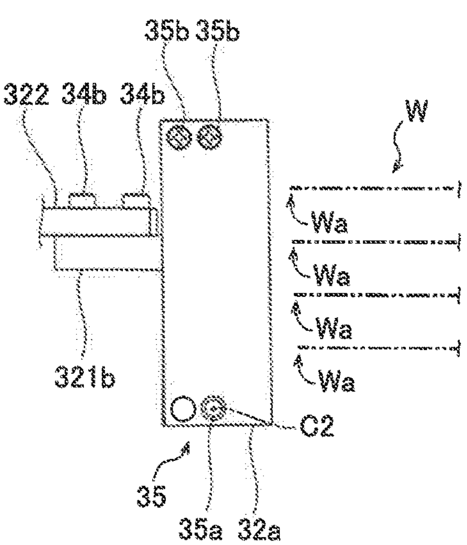

As shown in FIGS. 3 to 9, the inclination adjusting mechanisms 34 (35) can adjust the inclinations of the pressing members 32*a* by rotating the pressing members 32*a* about predetermined rotation axes C1 (C2). The inclination adjusting mechanisms 36 (37) can adjust the inclinations of the pressing members 33*a* by rotating the pressing members 33*a* about predetermined rotation axes C3 (C4). FIGS. 6 and 7 show adjustment of the inclinations of the pressing members 32*a* in an exaggerated manner for easy understanding.

The inclination adjusting mechanisms 34 (35) include inclination adjusting pins 34*a* (35*a*) to support the pressing members 32*a* such that the pressing members 32*a* are rotatable about the predetermined rotation axes C1 (C2), and can adjust the inclinations of the pressing members 32*a* by rotating the pressing members 32*a* about the predetermined rotation axes C1 (C2) with the inclination adjusting pins 34*a* (35*a*) as the center of rotation. The inclination adjusting mechanisms 36 (37) include inclination adjusting pins 36*a* (37*a*) to support the pressing members 33*a* such that the pressing members 33*a* are rotatable about the predetermined rotation axes C3 (C4), and can adjust the inclinations of the pressing members 33*a* by rotating the pressing members 33*a* about the predetermined rotation axes C3 (C4) with the inclination adjusting pins 36*a* (37*a*) as the center of rotation. The inclination adjusting pins 34*a* and 36*a* are examples of a "first inclination adjusting pin" in the claims. The inclination adjusting pins 35*a* and 37*a* are examples of a "second inclination adjusting pin" in the claims.

The inclination adjusting pins 34*a* (36*a*) extend in a direction (Z direction) perpendicular to the main surfaces 31*c* of the blades 31. The inclination adjusting mechanisms 34 (36) can adjust the inclinations of the pressing members 32*a* (33*a*) in a plane (X-Y plane) parallel to the main surfaces 31*c* of the blades 31 by rotating the pressing members 32*a* (33*a*) about the rotation axes C1 (C3) extending in the direction (Z direction) perpendicular to the main surfaces 31*c* of the blades 31 with the inclination adjusting pins 34*a* (36*a*) as the center of rotation.

The pressing members 32*a* (33*a*) include a pair of pressing members 32*a* (33*a*). The inclination adjusting pins 34*a* (36*a*) include a pair of inclination adjusting pins 34*a* (36*a*) corresponding to the pair of pressing members 32*a* (33*a*). The inclination adjusting mechanisms 34 (36) can adjust the inclinations of the pair of pressing members 32*a* (33*a*) in the plane (X-Y plane) parallel to the main surfaces 31*c* of the blades 31 such that the pair of pressing members 32*a* (33*a*) approach each other or move away from each other in the plane (X-Y plane) parallel to the main surfaces 31*c* of the blades 31 by rotating each of the pair of pressing members 32*a* (33*a*) about the rotation axis C1 (C3) extending in the direction (Z direction) perpendicular to the main surfaces 31*c* of the blades 31 with each of the pair of inclination adjusting pins 34*a* (36*a*) as the center of rotation.

The inclination adjusting pins 35*a* (37*a*) extend in a direction (X direction) parallel to the main surfaces 31*c* of the blades 31 and perpendicular to a direction (Y direction) in which the movable pressing unit 32 (33) moves back and forth. The inclination adjusting mechanisms 35 (37) can adjust the inclinations of the pressing members 32*a* (33*a*) in a plane (Y-Z plane) perpendicular to the main surfaces 31*c* of the blades 31 by rotating the pressing members 32*a* (33*a*) about the rotation axes C2 (C4) extending in the direction (X direction) parallel to the main surfaces 31*c* of the blades 31 and perpendicular to the direction (Y direction) in which the movable pressing unit 32 (33) moves back and forth with the inclination adjusting pins 35*a* (37*a*) as the center of rotation.

The blades 31 includes a plurality of (four) blades 31 aligned in the direction (Z direction) perpendicular to the main surfaces 31*c* of the blades 31. The pressing members 32*a* (33*a*) press the substrates W arranged on the plurality of blades 31 in common. The inclination adjusting mechanisms 35 (37) can adjust the inclinations of the pressing members 32*a* (33*a*) in the plane (Y-Z plane) perpendicular to the main surfaces 31*c* of the blades 31 such that the inclinations of the pressing members 32*a* (33*a*) follow inclinations formed by the outer peripheral edges Wa of the plurality of (four) substrates W along the direction (Z direction) perpendicular to the main surfaces 31*c* of the blades 31 by rotating the pressing members 32*a* (33*a*) about the rotation axes C2 (C4) extending in the direction (X direction) parallel to the main surfaces 31*c* of the blades 31 and perpendicular to the direction (Y direction) in which the movable pressing unit moves back and forth with the inclination adjusting pins 35*a* (37*a*) as the center of rotation.

Figures 2, 3:
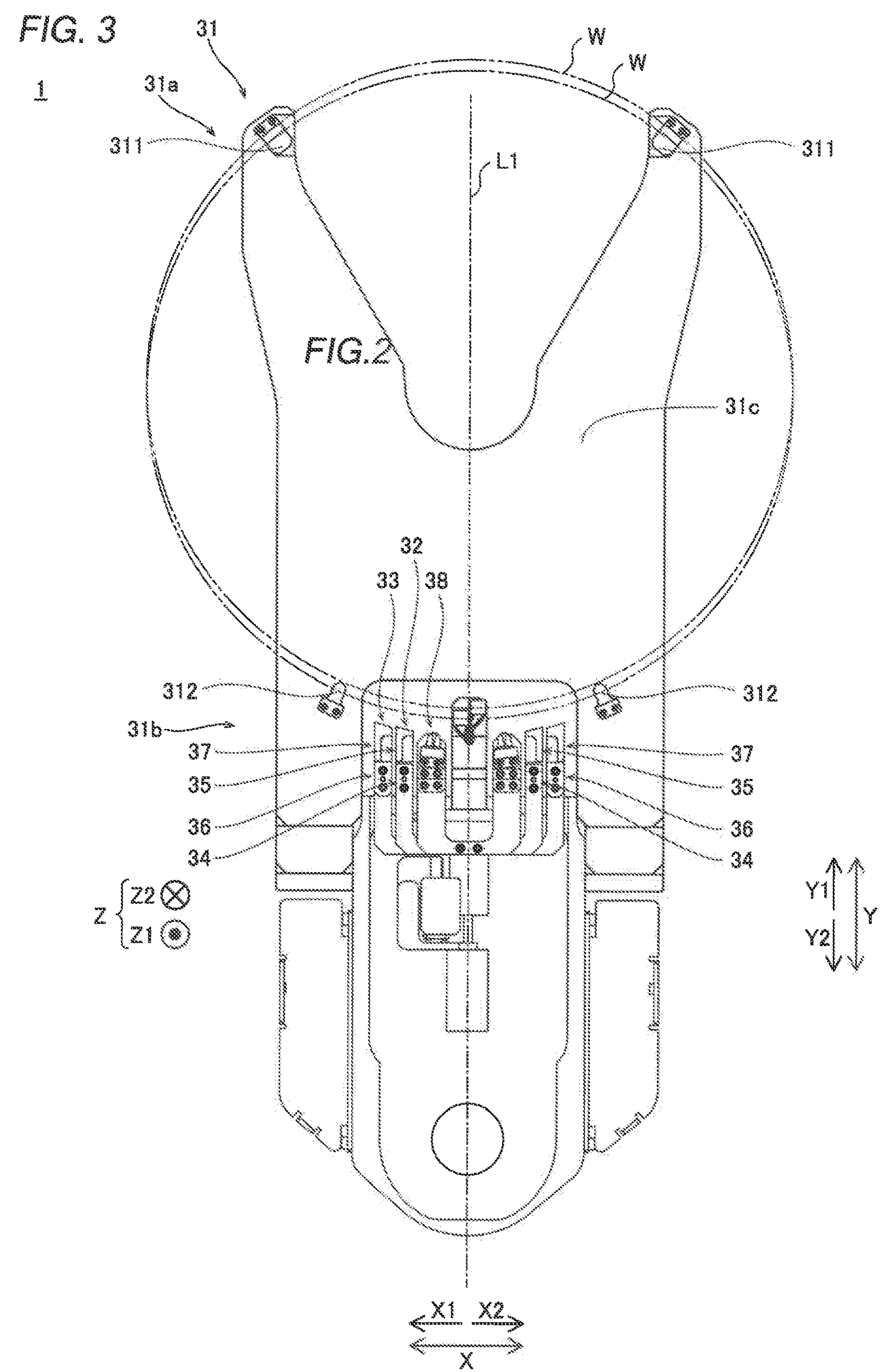
FIG. 3 is a plan view showing the configuration of the substrate holding hand according to the embodiment of the present invention.

As shown in FIG. 3, the substrate holding hand 1 further includes a movable support unit 38 including support members 38*a* that move back and forth to support the substrates W. The supports 311 and 312 include front supports 311 on the tip end 31*a* side (Y1 direction side) of each blade 31, and rear supports 312 on the base end 31*b* side (Y2 direction side) of each blade 31. The movable support unit 38 supports the substrates W together with the front supports 311. The movable pressing units 32 and 33 include a first movable pressing unit 32 to press the substrates W supported by the front supports 311 and the movable support unit 38, and a second movable pressing unit 33 to press the substrates W supported by the front supports 311 and the rear supports 312.

The pair of pressing members 32*a* (33*a*) are arranged at positions symmetrical with respect to a centerline L1 extending in the direction (Y direction) in which the movable pressing unit 32 (33) moves back and forth, as viewed in the direction (Z direction) perpendicular to the main surfaces 31*c* of the blades 31 and may press the substrates W at the positions symmetrical with respect to the centerline L1 extending in the direction (Y direction) in which the movable pressing unit 32 (33) moves back and forth, but the arrangement of the pair of pressing members 32*a* (33*a*) is not limited to this. The pair of pressing members 32*a* (33*a*)

is only required to press each substrate W at any two points on the arc of the substrate W. When the pair of pressing members 32*a* (33*a*) press each substrate W at any two points on the arc of the substrate W, the vector can be distributed, and thus the substrates W can be handled (the substrates W can be pressed and moved properly) even when the substrates W are stuck to the blades 31.

Figure 10:
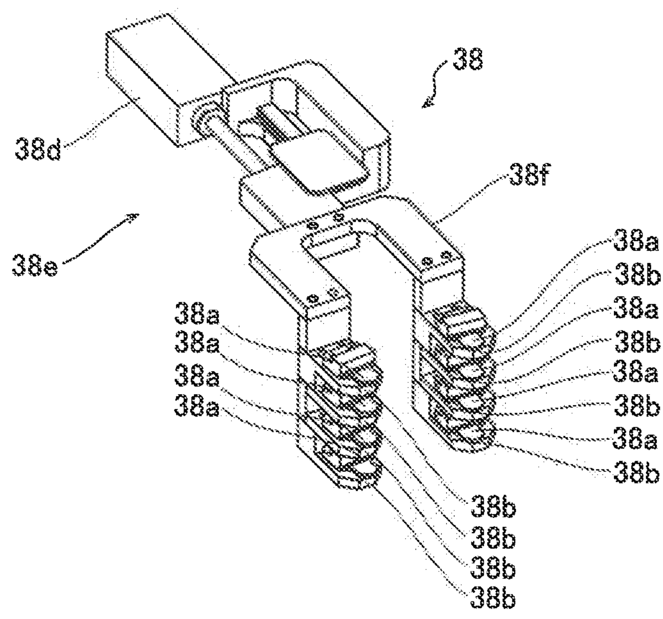
FIG. 10 is a perspective view showing the configuration of a movable support unit of the substrate holding hand according to the embodiment of the present invention.
Figure 11:
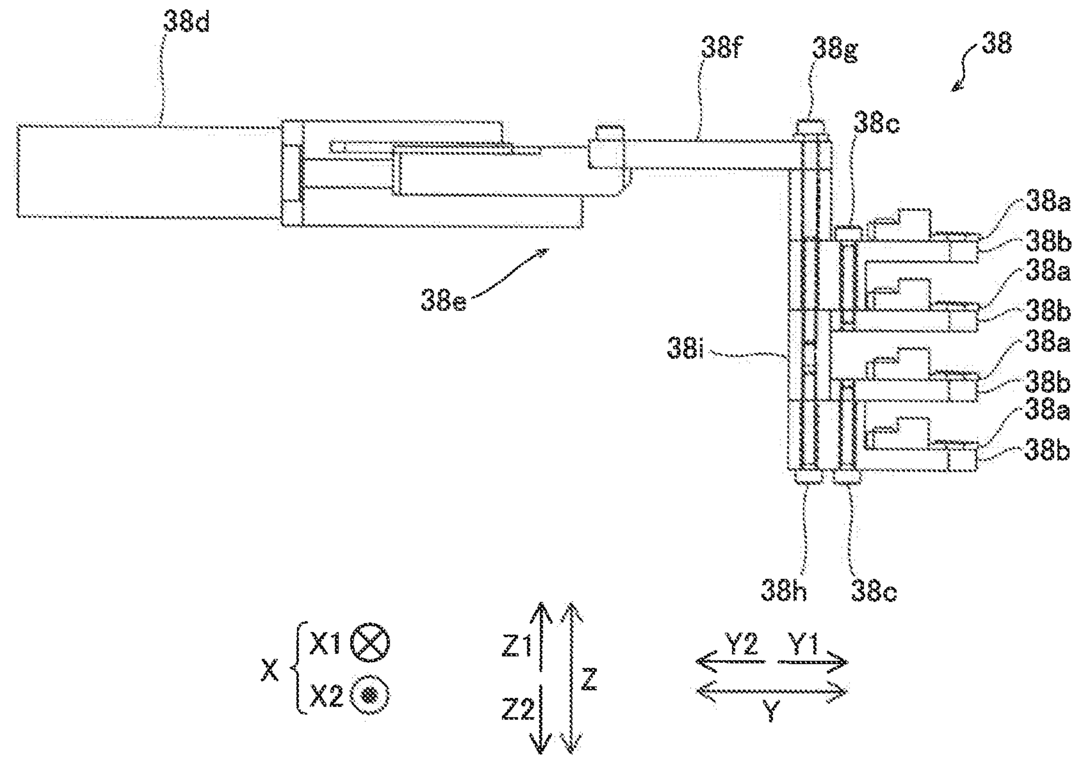
FIG. 11 is a side view showing the configuration of the movable support unit of the substrate holding hand according to the embodiment of the present invention.
Figure 12:
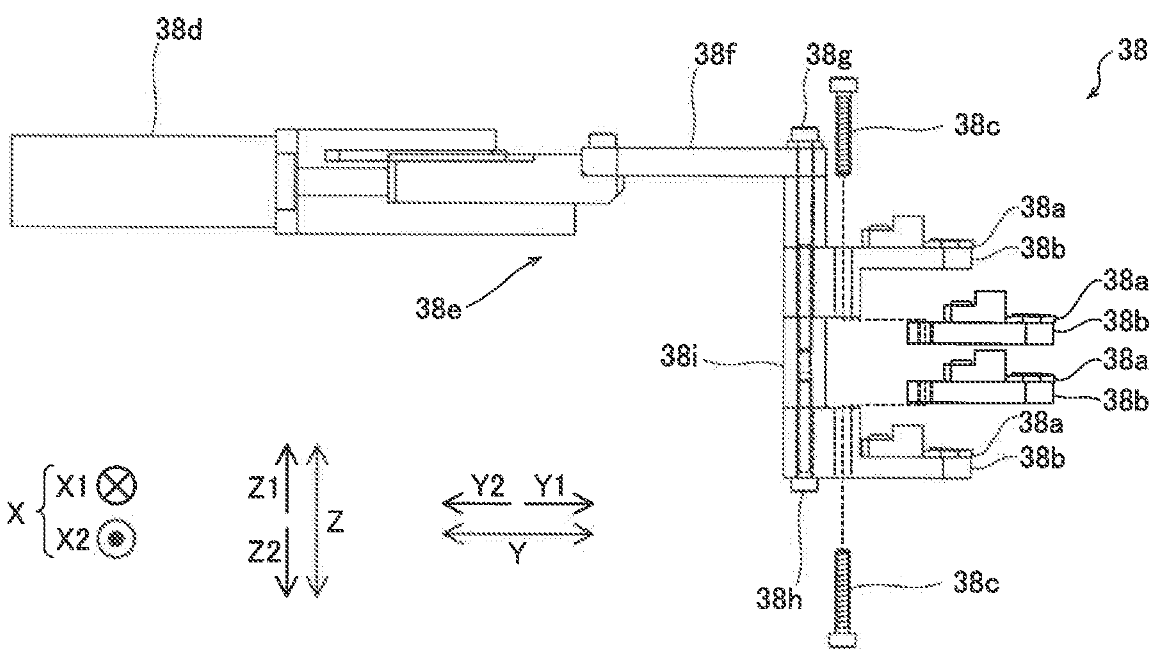
FIG. 12 is a diagram for illustrating replacement of support members of the movable support unit of the substrate holding hand according to the embodiment of the present invention.

As shown in FIGS. 10 to 12, the support members 38*a* include a plurality of (four) support members 38*a* aligned in the direction perpendicular to the main surfaces 31*c* of the blades 31 to support a plurality of (four) substrates W aligned in the direction (Z direction) perpendicular to the main surfaces 31*c* of the blades 31. Among the plurality of (four) support members 38*a* of the movable support unit 38, an intermediate support member (second or third stage support member) 38*a* can be replaced while an end support member (first or fourth stage support member) 38*a* in the direction (Z direction) perpendicular to the main surfaces 31*c* of the blades 31 is attached.

The movable support unit 38 further includes a plurality of mounting members 38*b* to which the support members 38*a* are mounted. The mounting member 38*b* of the intermediate support member (second or third stage support member) 38*a* is fixed to the mounting member 38*b* of the end support member (first or fourth stage support member) 38*a* via a fastening member 38*c*. The intermediate support member (second or third stage support member) 38*a* of the movable support unit 38 can be replaced while the end support member (first or fourth stage support member) 38*a* is attached by removing the fastening member 38*c* to remove the mounting member 38*b* of the intermediate support member (second or third stage support member) 38*a* from the mounting member 38*b* of the end support member (first or fourth stage support member) 38*a*.

As shown in FIG. 1, the arm 2 is a horizontal articulated robot arm. The arm 2 includes a first arm 2*a* and a second arm 2*b*. The first arm 2*a* is rotatable with respect to a base 5, which is described below, with a first end as the center of rotation. Specifically, the first end of the first arm 2*a* is rotatably connected to the base 5 via a first joint. The second arm 2*b* is rotatable with respect to the first arm 2*a* with a first end as the center of rotation. Specifically, the first end of the second arm 2*b* is rotatably connected to a second end of the first arm 2*a* via a second joint. The substrate holding hand 1 is rotatably connected to a second end of the second arm 2*b* via a third joint. A drive mechanism including a servomotor corresponding to a drive source for rotary drive, a rotational position sensor that detects the rotational position of an output shaft of the servomotor, and a power transmission mechanism that transmits the output of the servomotor to the joint is provided at each of the first joint, the second joint, and the third joint.

The substrate conveying robot 100 further includes the base 5 to which the arm 2 is attached, and an arm elevating mechanism 6 to which the base 5 is attached. A first end of the base 5 is connected to the first end of the first arm 2*a*, and a second end of the base 5 is connected to the arm elevating mechanism 6. The arm elevating mechanism 6 moves the arm 2 up and down by moving the base 5 up and down. The arm elevating mechanism 6 includes a servomotor corresponding to a drive source for up-down drive, a rotational position sensor that detects the rotational position of an output shaft of the servomotor, and a power transmission mechanism that transmits the output of the servomotor to the base 5 (arm 2).

Figure 2:
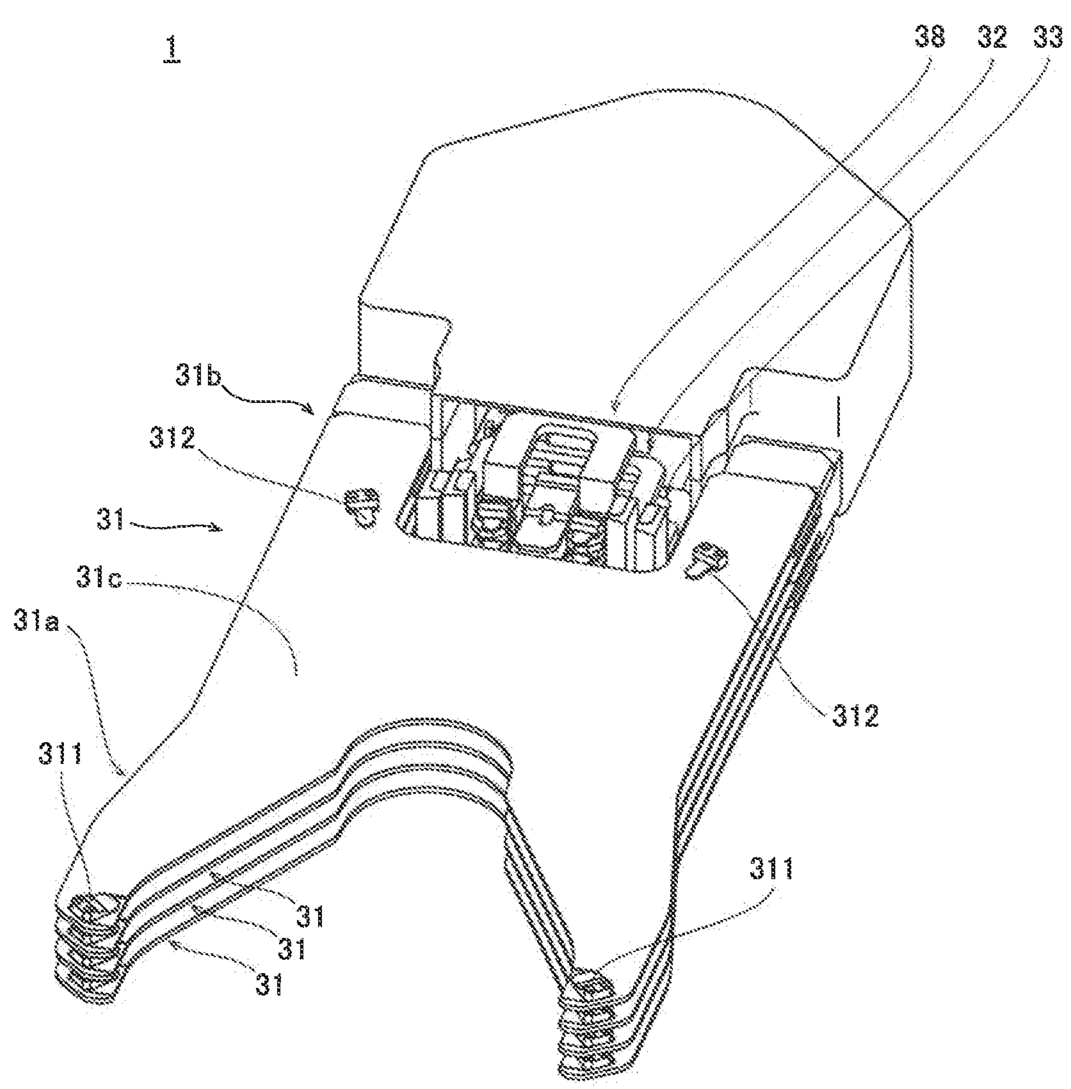
FIG. 2 is a perspective view showing the configuration of a substrate holding hand according to the embodiment of the present invention.

As shown in FIG. 2, the substrate holding hand 1 includes the plurality of (four) blades 31. That is, the substrate holding hand 1 can convey (hold) the plurality of (four) substrates W.

The blades 31 are thin support plates that support the substrates W. Each of the blades 31 has a shape in which the tip end 31*a* side is bifurcated. In the blade 31, a pair of front supports 311 are distributed to the bifurcated portions. The pair of front supports 311 each have a plurality of (two) support surfaces at different heights. A pair of rear supports 312 each have a support surface at a height substantially the same as the heights of the support surfaces of the pair of front supports 311 on the lower side (Z2 direction side). The "height" refers to a distance from the main surfaces 31*c* of the blades 31 in the direction (Z direction) perpendicular to the main surfaces 31*c* of the blades 31.

The pair of front supports 311 and the pair of rear supports 312 are provided on the main surface 31*c* of each blade 31. The support surfaces of the pair of front supports 311 and the pair of rear supports 312 support the rear surface (the surface on the Z2 direction side) of the outer peripheral edge of a substantially circular substrate W from below.

As shown in FIGS. 2 to 12, the substrate holding hand 1 includes the first movable pressing unit 32, the second movable pressing unit 33, and the movable support unit 38.

Figures 4, 5:
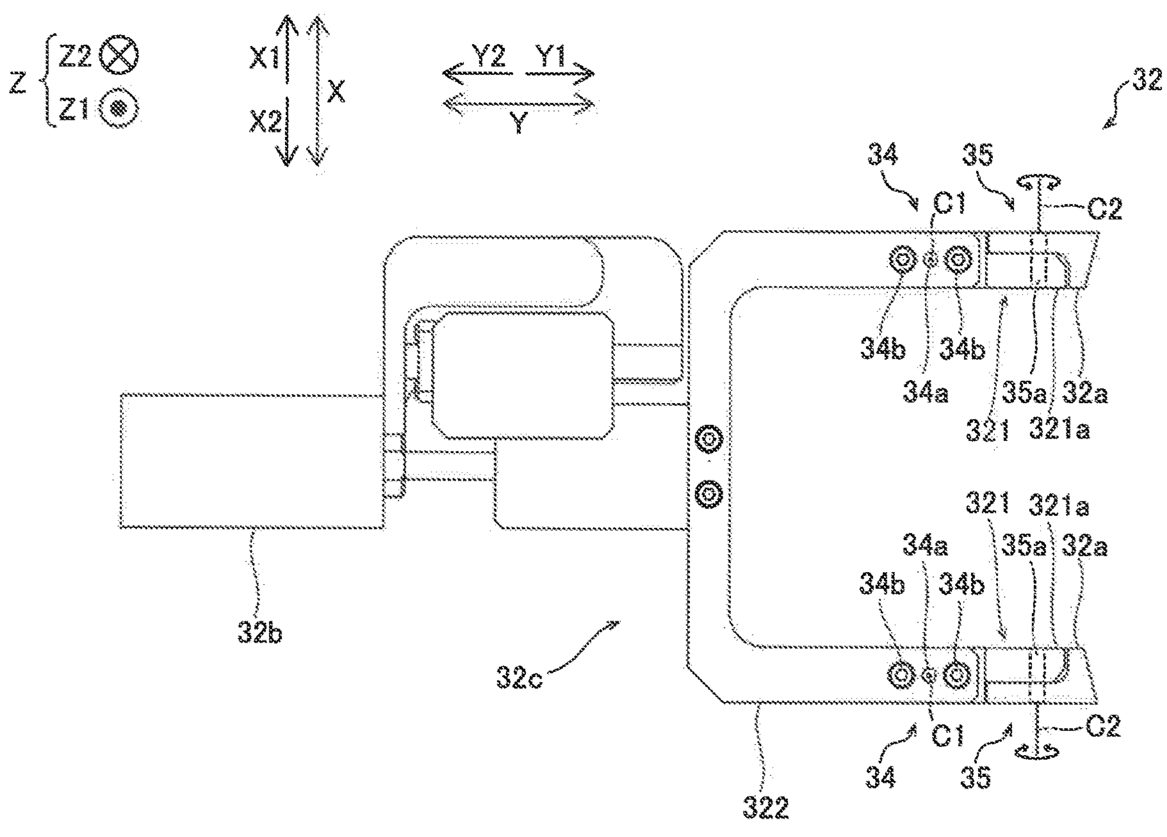
FIG. 4 is a plan view showing the configuration of a first movable pressing unit of the substrate holding hand according to the embodiment of the present invention.
FIG. 5 is a side view showing the configuration of the first movable pressing unit of the substrate holding hand according to the embodiment of the present invention.

As shown in FIGS. 4 and 5, the first movable pressing unit 32 includes the pressing members 32*a*, an air cylinder 32*b* corresponding to an actuator that moves the pressing members 32*a* back and forth in the Y direction, and a mount 32*c* to which the pressing members 32*a* are mounted and that connects the pressing members 32*a* to the air cylinder 32*b*. In the first movable pressing unit 32, the pressing members 32*a* can be moved forward in the Y1 direction via the mount 32*c* by the air cylinder 32*b* to press the substrates W. Furthermore, in the first movable pressing unit 32, the pressing members 32*a* can be moved backward in the Y2 direction via the mount 32*c* by the air cylinder 32*b* to be placed at retracted positions at which the pressing members 32*a* do not press the substrates W.

The pressing members 32*a* include the pair of pressing members 32*a* aligned in the X direction. The pair of pressing members 32*a* extend in the direction (Z direction) perpendicular to the main surfaces 31*c* of the blades 31 so as to be able to collectively press the plurality of substrates W supported by the plurality of blades 31. The air cylinder 32*b* includes a rod that moves back and forth in the Y direction. The rod of the air cylinder 32*b* is connected to the base end of the mount 32*c*. The mount 32*c* has a shape in which the tip end side (Y1 direction side) is bifurcated. In the mount 32*c*, the pair of pressing members 32*a* are distributed to the bifurcated portions.

The mount 32*c* includes a pair of first mounting members 321 to which the pressing members 32*a* are mounted, and a second mounting member 322 to which the pair of first mounting members 321 are mounted. The first mounting members 321 include first portions 321*a* to which the pressing members 32*a* are mounted and second portions 321*b* mounted to the second mounting member 322. The first portions 321*a* have substantially the same lengths as the pressing members 32*a* and extend in the direction (Z direction) perpendicular to the main surfaces 31*c* of the blades 31. The pressing members 32*a* are fixed to the first portions 321*a* by fastening members 35*b*.

The inclination adjusting mechanisms 35 include the fastening members 35*b*. The inclination adjusting mechanisms 35 can adjust the inclinations of the pressing members 32*a* in the plane (Y-Z plane) perpendicular to the main surfaces 31*c* of the blades 31 by rotating the pressing members 32*a* about the rotation axes C2 with the inclination adjusting pins 35*a* as the center of rotation while the fastening members 35*b* are loosened (see FIG. 7). Furthermore, the inclination adjusting mechanisms 35 fix the inclinations of the pressing members 32*a* by tightening the fastening members 35*b* in a state in which the inclinations of the pressing members 32*a* in the plane (Y-Z plane) perpendicular to the main surfaces 31*c* of the blades 31 have been adjusted by the inclination adjusting pins 35*a*. The fastening members 35*b* extend in a direction (X direction) parallel to a direction in which the inclination adjusting pins 35*a* extend. The inclination adjusting pins 35*a* are inserted into the pressing members 32*a* and the first portions 321*a* of the first mounting members 321 in the X direction.

The second portions 321*b* of the first mounting members 321 extend from the first portions 321*a* toward the air cylinder 32*b* (in the Y2 direction). The second portions 321*b* are mounted to the second mounting member 322. The second mounting member 322 has a shape in which the tip end side (Y1 direction side) is bifurcated. The first mounting member 321 is fixed to each of the bifurcated tip ends of the second mounting member 322 by fastening member 34*b*.

The inclination adjusting mechanisms 34 include the fastening members 34*b*. The inclination adjusting mechanisms 34 can adjust the inclinations of the pressing members 32*a* in the plane (X-Y plane) parallel to the main surfaces 31*c* of the blades 31 by rotating the first mounting members 321 and the pressing members 32*a* about the rotation axes C1 with the inclination adjusting pins 34*a* as the center of rotation while the fastening members 34*b* are loosened (see FIG. 6). Furthermore, the inclination adjusting mechanisms 34 fix the inclinations of the pressing members 32*a* by tightening the fastening members 34*b* in a state in which the inclinations of the pressing members 32*a* in the plane (X-Y plane) parallel to the main surfaces 31*c* of the blades 31 have been adjusted by the inclination adjusting pins 34*a*. The fastening members 34*b* extend in a direction (Z direction) parallel to a direction in which the inclination adjusting pins 34*a* extend. The inclination adjusting pins 34*a* are inserted into the second portions 321*b* of the first mounting members 321 and the second mounting member 322 in the Z direction.

Figure 8:
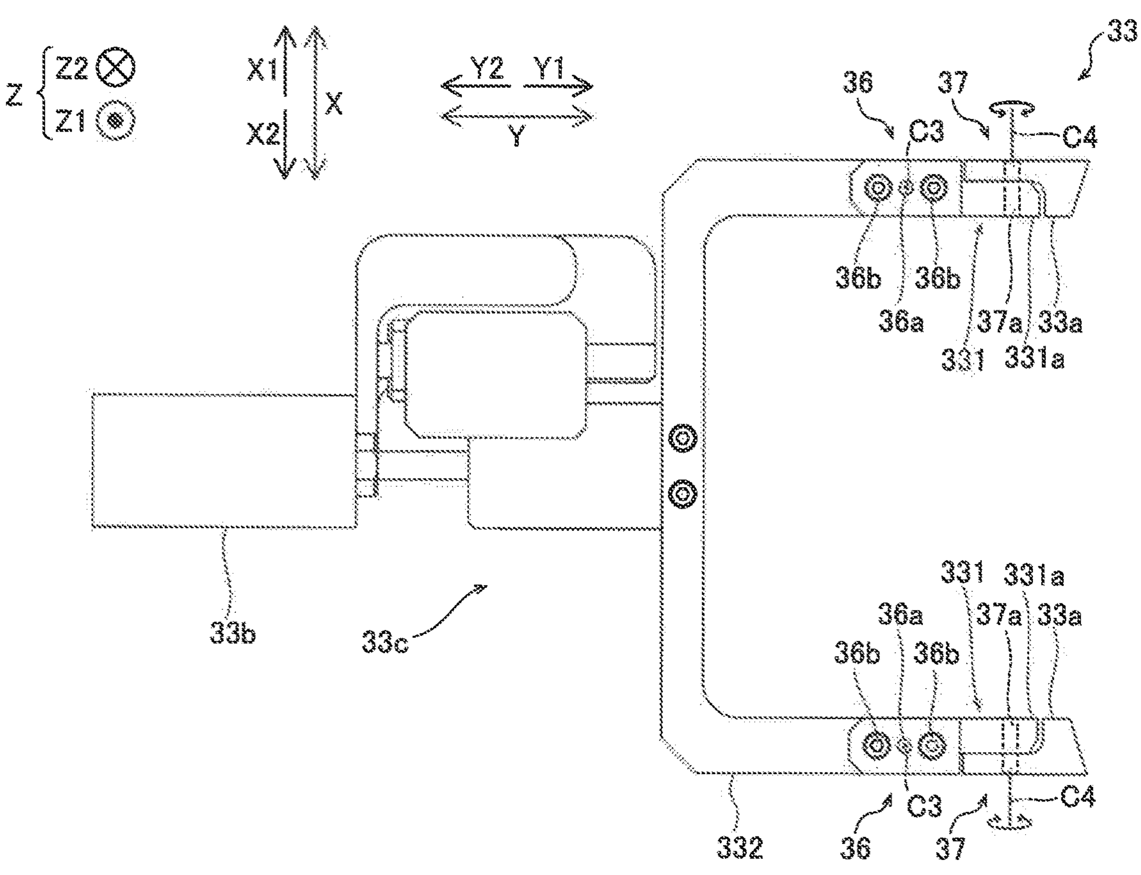
FIG. 8 is a plan view showing the configuration of a second movable pressing unit of the substrate holding hand according to the embodiment of the present invention.
Figure 9:
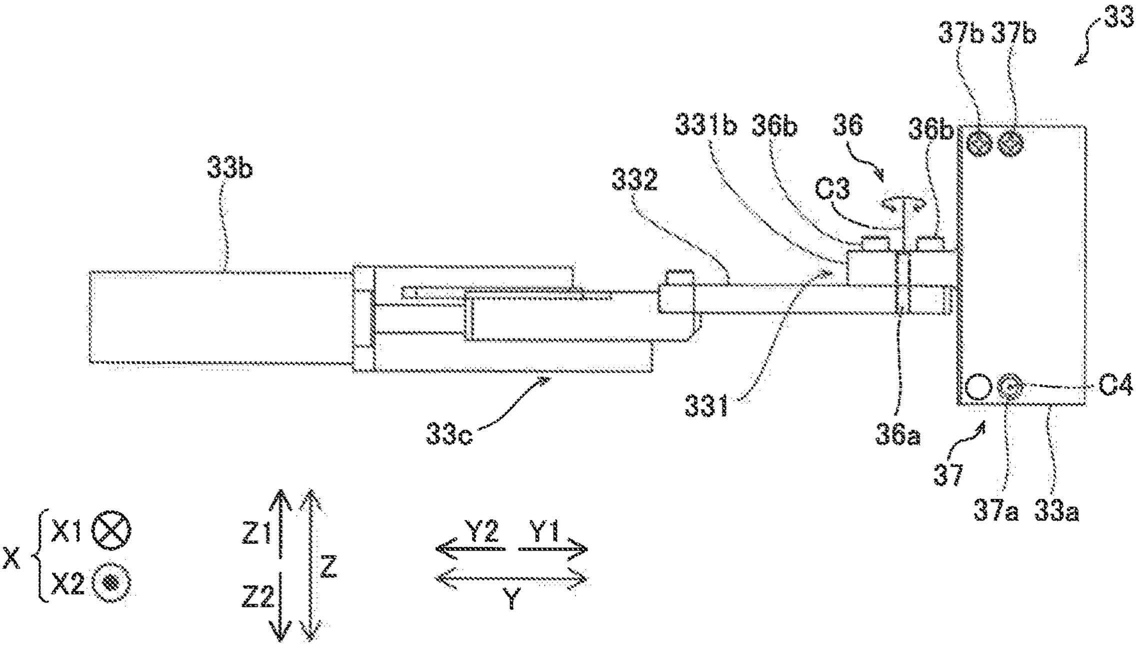
FIG. 9 is a side view showing the configuration of the second movable pressing unit of the substrate holding hand according to the embodiment of the present invention.

As shown in FIGS. 8 and 9, the second movable pressing unit 33 includes the pressing members 33*a*, an air cylinder 33*b* corresponding to an actuator that moves the pressing members 33*a* back and forth in the Y direction, and a mount 33*c* to which the pressing members 33*a* are mounted and that connects the pressing members 33*a* to the air cylinder 33*b*. In the second movable pressing unit 33, the pressing members 33*a* can be moved forward in the Y1 direction via the mount 33*c* by the air cylinder 33*b* to press the substrates W. Furthermore, in the second movable pressing unit 33, the pressing members 33*a* can be moved backward in the Y2 direction via the mount 33*c* by the air cylinder 33*b* to be placed at retracted positions at which the pressing members 33*a* do not press the substrates W.

The pressing members 33*a* include the pair of pressing members 33*a* aligned in the X direction. The pair of pressing members 33*a* extend in the direction (Z direction) perpendicular to the main surfaces 31*c* of the blades 31 so as to be able to collectively press the plurality of substrates W supported by the plurality of blades 31. The air cylinder 33*b* includes a rod that moves back and forth in the Y direction. The rod of the air cylinder 33*b* is connected to the base end of the mount 33*c*. The mount 33*c* has a shape in which the tip end side (Y1 direction side) is bifurcated. In the mount 33*c*, the pair of pressing members 33*a* are distributed to the bifurcated portions.

The mount 33*c* includes a pair of first mounting members 331 to which the pressing members 33*a* are mounted, and a second mounting member 332 to which the pair of first mounting members 331 are mounted. The first mounting members 331 include first portions 331*a* to which the pressing members 33*a* are mounted and second portions 331*b* mounted to the second mounting member 332. The first portions 331*a* have substantially the same lengths as the pressing members 33*a* and extend in the direction (Z direction) perpendicular to the main surfaces 31*c* of the blades 31. The pressing members 33*a* are fixed to the first portions 331*a* by fastening members 37*b*.

The inclination adjusting mechanisms 37 include the fastening members 37*b*. The inclination adjusting mechanisms 37 can adjust the inclinations of the pressing members 33*a* in the plane (Y-Z plane) perpendicular to the main surfaces 31*c* of the blades 31 by rotating the pressing members 33*a* about the rotation axes C4 with the inclination adjusting pins 37*a* as the center of rotation while the fastening members 37*b* are loosened (see FIG. 7). Furthermore, the inclination adjusting mechanisms 37 fix the inclinations of the pressing members 33*a* by tightening the fastening members 37*b* in a state in which the inclinations of the pressing members 33*a* in the plane (Y-Z plane) perpendicular to the main surfaces 31*c* of the blades 31 have been adjusted by the inclination adjusting pins 37*a*. The fastening members 37*b* extend in a direction (X direction) parallel to a direction in which the inclination adjusting pins 37*a* extend. The inclination adjusting pins 37*a* are inserted into the pressing members 33*a* and the first portions 331*a* of the first mounting members 331 in the X direction.

The second portions 331*b* of the first mounting members 331 extend from the first portions 331*a* toward the air cylinder 33*b* (in the Y2 direction). The second portions 331*b* are mounted to the second mounting member 332. The second mounting member 332 has a shape in which the tip end side (Y1 direction side) is bifurcated. The first mounting member 331 is fixed to each of the bifurcated tip ends of the second mounting member 332 by fastening member 36*b*.

The inclination adjusting mechanisms 36 include the fastening members 36*b*. The inclination adjusting mechanisms 36 can adjust the inclinations of the pressing members 33*a* in the plane (X-Y plane) parallel to the main surfaces 31*c* of the blades 31 by rotating the first mounting members 331 and the pressing members 33*a* about the rotation axes C3 with the inclination adjusting pins 36*a* as the center of rotation while the fastening members 36*b* are loosened (see FIG. 6). Furthermore, the inclination adjusting mechanisms 36 fix the inclinations of the pressing members 33*a* by tightening the fastening members 36*b* in a state in which the inclinations of the pressing members 33*a* in the plane (X-Y plane) parallel to the main surfaces 31*c* of the blades 31 have been adjusted by the inclination adjusting pins 36*a*. The fastening members 36*b* extend in a direction (Z direction) parallel to a direction in which the inclination adjusting pins 36*a* extend. The inclination adjusting pins 36*a* are inserted into the second portions 331*b* of the first mounting members 331 and the second mounting member 332 in the Z direction.

As shown in FIGS. 10 to 12, the movable support unit 38 includes the support members 38*a*, an air cylinder 38*d* corresponding to an actuator that moves the support members 38*a* back and forth in the Y direction, and a mount 38*e* to which the support members 38*a* are mounted and that connects the support members 38*a* to the air cylinder 38*d*. In the movable support unit 38, the support members 38*a* can be moved forward in the Y1 direction via the mount 38*e* by the air cylinder 38*d* to be placed at support positions at which the support members 38*a* support the substrates W. Furthermore, in the movable support unit 38, the support members 38*a* can be moved backward in the Y2 direction via the mount 38*e* by the air cylinder 38*d* to be placed at retracted positions at which the support members 38*a* do not support the substrates W.

The support members 38*a* include pairs of support members 38*a* aligned in the X direction. The pairs of support members 38*a* corresponding to the number (four sets) of blades 31 are aligned in the direction (Z direction) perpendicular to the main surfaces 31*c* of the blades 31. The pairs of support members 38*a* have support surfaces at heights substantially the same as the heights of the upper (Z1 direction side) support surfaces of pairs of front supports 311. Each support surface of the pairs of support members 38*a* supports the rear surface (the surface on the Z2 direction side) of the outer peripheral edge of the substantially circular substrate W from below. The air cylinder 38*d* includes a rod that moves back and forth in the Y direction. The rod of the air cylinder 38*d* is connected to the base end of the mount 38*e*. The mount 38*e* has a shape in which the tip end side (Y1 direction side) is bifurcated. In the mount 38*e*, the pairs of support members 38*a* are distributed to the bifurcated portions.

The mount 38*e* includes the mounting members 38*b* and a mounting member 38*f* to which the mounting members 38*b* are mounted. The mounting members 38*b* include plate-shaped pedestals having upper surfaces to which the support members 38*a* are mounted. The pedestals of the mounting members 38*b* extend in a direction (Y direction) in which the movable support unit 38 moves back and forth. The mounting member 38*f* has a shape in which the tip end side (Y1 direction side) is bifurcated. The support members 38*a* and the mounting members 38*b* are provided at each of the bifurcated tip ends of the mounting member 38*f*.

The upper (Z1 direction side) end support members (first stage support members) 38*a* are fixed to the mounting member 38*f* by fastening members 38*g*. The upper (Z1 direction side) intermediate support members (second stage support members) 38*a* are fixed to the upper (Z1 direction side) end support members (first stage support members) 38*a* by the upper (Z1 direction side) fastening members 38*c*. The fastening members 38*g* and the upper (Z1 direction side) fastening members 38*c* have heads exposed to the upper side (Z1 direction side), with which a removal tool (such as a hexagonal wrench) engages.

The lower (Z2 direction side) end support members (fourth stage support members) 38*a* are fixed to spacers 38*i* by fastening members 38*h*. The spacers 38*i* are fixed to the mounting member 38*f* together with the upper (Z1 direction side) end support members (first stage support members) 38*a* by the fastening members 38*h*. The lower (Z2 direction side) intermediate support members (third stage support members) 38*a* are fixed to the lower (Z2 direction side) end support members (fourth stage support members) 38*a* by the lower (Z2 direction side) fastening members 38*c*. The fastening members 38*h* and the lower (Z2 direction side) fastening members 38*c* have heads exposed to the lower side (Z2 direction side), with which a removal tool (such as a hexagonal wrench) engages.

In the movable support unit 38, the intermediate support members 38*a* can be removed while the end support members 38*a* are mounted to a main body of the mount 38*e* on both of one side (Z1 direction side, upper side) and the other side (Z2 direction side, lower side) in the direction (Z direction) perpendicular to the main surfaces 31*c* of the blades 31. In the movable support unit 38, the plurality of (four) support members 38*a* can be removed by removing the fastening members 38*g* to remove a plurality of (four) mounting members 38*b* from the mounting member 38*f*. Furthermore, in the movable support unit 38, the lower (Z2 direction side) end support members 38*a* and the lower (Z2 direction side) intermediate support members 38*a* can be removed by removing the fastening members 38*h* to remove the mounting members 38*b* of the lower (Z2 direction side) end support members 38*a* and the mounting members 38*b* of the lower (Z2 direction side) intermediate support members 38*a*.

In the substrate holding hand 1, the upper (Z1 direction side) support surfaces of the pairs of front supports 311 and the support surfaces of the pairs of support members 38*a* of the movable support unit 38 support the processed (washed) substrates W. The pair of pressing members 32*a* of the first movable pressing unit 32 press the processed (washed) substrates W supported by the upper (Z1 direction side) support surfaces of the pairs of front supports 311 and the support surfaces of the pairs of support members 38*a* of the movable support unit 38.

In the substrate holding hand 1, the lower (Z2 direction side) support surfaces of the pairs of front supports 311 and the support surfaces of pairs of rear supports 312 support the substrates W prior to processing (washing). The pair of pressing members 33*a* of the second movable pressing unit 33 press the substrates W prior to processing (washing) supported by the lower (Z2 direction side) support surfaces of the pairs of front supports 311 and the support surfaces of the pairs of rear supports 312. The pairs of front supports 311, the pairs of rear supports 312, the movable support unit 38, the first movable pressing unit 32, and the second movable pressing unit 33 are used properly for the substrates W prior to processing (washing) and the processed (washed) substrates W.

Advantages of this Embodiment

According to this embodiment, the following advantages are achieved.

According to this embodiment, as described above, the inclination adjusting mechanisms 34 and 35 (36 and 37) are provided to adjust the inclinations of the pressing members 32*a* (33*a*). Accordingly, the inclinations of the pressing members 32*a* (33*a*) can be adjusted to appropriate inclinations according to the actual positions of the substrates W to be pressed by the pressing members 32*a* (33*a*), and thus even when the actual positions of the substrates W to be pressed by the pressing members 32*a* (33*a*) deviate from the originally assumed design positions, the substrates W can be appropriately pressed by the pressing members 32*a* (33*a*).

According to this embodiment, as described above, the inclination adjusting mechanisms 34 and 35 (36 and 37) are operable to adjust the inclinations of the pressing members 32*a* (33*a*) by rotating the pressing members 32*a* (33*a*) about the predetermined rotation axes C1 and C2 (C3 and C4). Accordingly, the inclinations of the pressing member 32*a* (33*a*) can be easily adjusted to appropriate inclinations according to the positions of the substrates W only by rotating the pressing members 32*a* (33*a*) about the predetermined rotation axes C1 and C2 (C3 and C4).

According to this embodiment, as described above, the inclination adjusting mechanisms 34 and 35 (36 and 37) include the inclination adjusting pins 34*a* and 35*a* (36*a* and 37a) to support the pressing members 32a (33a) such that the pressing members 32a (33a) are rotatable about the predetermined rotation axes C1 and C2 (C3 and C4), and are operable to adjust the inclinations of the pressing members 32a (33a) by rotating the pressing members 32a (33a) about the predetermined rotation axes C1 and C2 with the inclination adjusting pins 34a and 35a (36a and 37a) as the center of rotation. Accordingly, the inclination adjusting pins 34a and 35a (36a and 37a) can be used to easily and reliably rotate the pressing members 32a (33a) about the predetermined rotation axes C1 and C2 (C3 and C4), and thus the inclination adjusting mechanisms 34 and (36 and 37) including the inclination adjusting pins 34a and 35a (36a and 37a) can easily and reliably adjust the inclinations of the pressing members 32a (33a) to appropriate inclinations according to the positions of the substrates W.

According to this embodiment, as described above, the inclination adjusting pins 34a and 35a (36a and 37a) include the inclination adjusting pins 34a (36a) extending in the direction perpendicular to the main surfaces 31c of the blades 31. Furthermore, the inclination adjusting mechanisms 34 (36) are operable to adjust the inclinations of the pressing members 32a (33a) in the plane parallel to the main surfaces 31c of the blades 31 by rotating the pressing members 32a (33a) about the rotation axes C1 (C3) extending in the direction perpendicular to the main surfaces 31c of the blades 31 with the inclination adjusting pins 34a (36a) as the center of rotation. Accordingly, the inclinations of the pressing members 32a (33a) in the plane parallel to the main surfaces 31c of the blades 31 can be adjusted so as to appropriately correspond to the outer peripheral edges Wa of the substrates W, and thus failure of the pressing members 32a (33a) to appropriately press the substrates W due to the inclinations of the pressing members 32a (33a) in the plane parallel to the main surfaces 31c of the blades 31 that do not appropriately correspond to the outer peripheral edges Wa of the substrates W can be reduced or prevented.

According to this embodiment, as described above, the pressing members 32a (33a) include the pair of pressing members 32a (33a). The inclination adjusting pins 34a (36a) include the pair of inclination adjusting pins 34a (36a) corresponding to the pair of pressing members 32a (33a). The inclination adjusting mechanisms 34 (36) are operable to adjust the inclinations of the pair of pressing members 32a (33a) in the plane parallel to the main surfaces 31c of the blades 31 such that the pair of pressing members 32a (33a) approach each other or move away from each other in the plane parallel to the main surfaces 31c of the blades 31 by rotating each of the pair of pressing members 32a (33a) about the rotation axis C1 (C3) extending in the direction perpendicular to the main surfaces 31c of the blades 31 with each of the pair of inclination adjusting pins 34a (36a) as the center of rotation. Accordingly, the inclinations of the pair of pressing members 32a (33a) in the plane parallel to the main surfaces 31c of the blades 31 can be easily adjusted so as to appropriately correspond to the outer peripheral edges Wa of the substrates W, and thus failure of the pair of pressing members 32a (33a) to appropriately press the substrates W due to the inclinations of the pair of pressing members 32a (33a) in the plane parallel to the main surfaces 31c of the blades 31 that do not appropriately correspond to the outer peripheral edges Wa of the substrates W can be easily reduced or prevented.

According to this embodiment, as described above, the inclination adjusting pins 34a and 35a (36a and 37a) include the inclination adjusting pins 35a (37a) extending in the direction parallel to the main surfaces 31c of the blades 31 and perpendicular to the direction in which the movable pressing unit 32 (33) moves back and forth. Furthermore, the inclination adjusting mechanisms 35 (37) are operable to adjust the inclinations of the pressing members 32a (33a) in the plane perpendicular to the main surfaces 31c of the blades 31 by rotating the pressing members 32a (33a) about the rotation axes C2 (C4) extending in the direction parallel to the main surfaces 31c of the blades 31 and perpendicular to the direction in which the movable pressing unit 32 (33) moves back and forth with the inclination adjusting pins 35a (37a) as the center of rotation. Accordingly, the inclinations of the pressing members 32a (33a) in the plane perpendicular to the main surfaces 31c of the blades 31 can be adjusted so as to appropriately correspond to the inclinations of the substrates W in the plane perpendicular to the main surfaces 31c of the blades 31 (the inclinations of the substrates W with respect to a horizontal direction), and thus failure of the pressing members 32a (33a) to appropriately press the substrates W due to the inclinations of the pressing members 32a (33a) in the plane perpendicular to the main surfaces 31c of the blades 31 that do not appropriately correspond to the inclinations of the substrates W in the plane perpendicular to the main surfaces 31c of the blades 31 can be reduced or prevented.

According to this embodiment, as described above, the blades 31 include the plurality of blades 31 aligned in the direction perpendicular to the main surfaces 31c of the blades 31. The pressing members 32a (33a) press the substrates W arranged on the plurality of blades 31 in common. The inclination adjusting mechanisms 35 (37) are operable to adjust the inclinations of the pressing members 32a (33a) in the plane perpendicular to the main surfaces 31c of the blades 31 such that the inclinations of the pressing members 32a (33a) follow inclinations formed by the outer peripheral edges Wa of the plurality of substrates W along the direction perpendicular to the main surfaces 31c of the blades 31 by rotating the pressing members 32a (33a) about the rotation axes C2 (C4) extending in the direction parallel to the main surfaces 31c of the blades 31 and perpendicular to the direction in which the movable pressing unit 32 (33) moves back and forth with the inclination adjusting pins 35a (37a) as the center of rotation. Accordingly, the inclinations of the pressing members 32a (33a) in the plane perpendicular to the main surfaces 31c of the blades 31 can be adjusted so as to appropriately correspond to the inclinations formed by the outer peripheral edges Wa of the plurality of substrates W along the direction perpendicular to the main surfaces 31c of the blades 31. Consequently, in the configuration in which the plurality of substrates W are pressed in common by the pressing members 32a (33a), failure of the pressing members 32a (33a) to appropriately press the plurality of substrates W due to the inclinations of the pressing members 32a (33a) in the plane perpendicular to the main surfaces 31c of the blades 31 that do not appropriately correspond to the inclinations formed by the outer peripheral edges Wa of the plurality of substrates W along the direction perpendicular to the main surfaces 31c of the blades 31 (the possibility that the substrate W at one end cannot be pressed while the substrate W at the other end can be pressed) can be reduced or prevented.

According to this embodiment, as described above, the substrate holding hand 1 further includes the movable support unit 38 that moves back and forth to support the substrates W. The supports 311 and 312 include the front supports 311 on the tip end 31a side of each blade 31 and the rear supports 312 on the base end 31b side of each blade 31. The movable support unit 38 supports the substrates W together with the front supports 311. The movable pressing units 32 and 33 (42 and 43) include the first movable pressing unit 32 to press the substrates W supported by the front supports 311 and the movable support unit 38, and the second movable pressing unit 33 to press the substrates W supported by the front supports 311 and the rear supports 312. Accordingly, two (two types of) substrates W can be held by one blade 31. Furthermore, even when the substrate holding hand 1 includes two movable pressing units, which are the first movable pressing unit 32 and the second movable pressing unit 33, the inclinations of the pressing members 32*a* (33*a*) of each of the two movable pressing units can be adjusted to appropriate inclinations.

According to this embodiment, as described above, the pressing members 32*a* (33*a*) include the pair of pressing members 32*a* (33*a*). The pair of pressing members 32*a* (33*a*) are arranged at the positions symmetrical with respect to the centerline L1 extending in the direction in which the movable pressing unit 32 (33) moves back and forth, as viewed in the direction (Z direction) perpendicular to the main surfaces 31*c* of the blades 31. Furthermore, the pair of pressing members 32*a* (33*a*) press the substrates W at the positions symmetrical with respect to the centerline L1 extending in the direction in which the movable pressing unit 32 (33) moves back and forth. Accordingly, unlike a case in which the movable pressing unit 32 (33) presses the substrates W with only one pressing member 32*a* (33*a*) (when the movable pressing unit 32 (33) presses the substrates W at one point), the substrates W are pressed by the pair of pressing members 32*a* (33*a*) (the substrates W are pressed at two points) such that the vector can be distributed, and thus the substrates W can be pressed and moved properly by the pair of pressing members 32*a* (33*a*) even when the substrates W are stuck to the blades 31.

According to this embodiment, as described above, the substrate holding hand 1 further includes the movable support unit 38 including the support members 38*a* that move back and forth to support the substrates W. The support members 38*a* include the plurality of support members 38*a* aligned in the direction perpendicular to the main surfaces 31*c* of the blades 31 to support the plurality of substrates W aligned in the direction perpendicular to the main surfaces 31*c* of the blades 31. Among the plurality of support members 38*a* of the movable support unit 38, the intermediate support members 38*a* are replaceable while the end support members 38*a* in the direction perpendicular to the main surfaces 31*c* of the blades 31 are attached. Accordingly, the intermediate support members 38*a* are replaceable while the end support members 38*a* are attached, and thus as compared with a case in which it is necessary to collectively remove the plurality of support members 38*a*, the intermediate support members 38*a* can be easily replaced.

According to this embodiment, as described above, the movable support unit 38 further includes the plurality of mounting members 38*b* to allow the support members 38*a* to be mounted thereto. The mounting members 38*b* of the intermediate support members 38*a* are fixed to the mounting members 38*b* of the end support members 38*a* by the fastening members 38*c*. The intermediate support members 38*a* of the movable support unit 38 are replaceable while the end support members 38*a* are attached by removing the fastening members 38*c* to remove the mounting members 38*b* of the intermediate support members 38*a* from the mounting members 38*b* of the end support members 38*a*. Accordingly, the intermediate support members 38*a* can be replaced only by removing the fastening members 38*c*, and thus the intermediate support members 38*a* can be more easily replaced.

Modified Examples

The embodiment disclosed this time must be considered as illustrative in all points and not restrictive. The scope of the present invention is not shown by the above description of the embodiment but by the scope of claims for patent, and all modifications (modified examples) within the meaning and scope equivalent to the scope of claims for patent are further included.

For example, while the example in which the arm is a horizontal articulated robot arm has been shown in the aforementioned embodiment, the present invention is not limited to this. For example, the arm may be an arm other than a horizontal articulated robot arm, such as a vertical articulated robot arm.

While the example in which the substrate holding hand includes a plurality of blades has been shown in the aforementioned embodiment, the present invention is not limited to this. For example, the substrate holding hand may include one blade.

While the example in which the substrate holding hand includes four blades has been shown in the aforementioned embodiment, the present invention is not limited to this. For example, the substrate holding hand may include a plurality of blades other than four.

While the example in which each of the blades has a bifurcated shape has been shown in the aforementioned embodiment, the present invention is not limited to this. For example, each of the blades may have a shape other than a bifurcated shape.

While the example in which each of the blades can support two substrates at different heights has been shown in the aforementioned embodiment, the present invention is not limited to this. For example, each of the blades may be able to support only one substrate (able to support a substrate at only one height).

While the example in which the movable support unit is provided has been shown in the aforementioned embodiment, the present invention is not limited to this. For example, the movable support unit may not be provided.

While the example in which the movable support unit includes pairs of support members has been shown in the aforementioned embodiment, the present invention is not limited to this. For example, the movable support unit may include one support member.

While the example in which two pressing units, which are the first movable pressing unit and the second movable pressing unit, are provided, has been shown in the aforementioned embodiment, the present invention is not limited to this. For example, only one movable pressing unit may be provided.

While the example in which each of the movable pressing units includes a pair of pressing members has been shown in the aforementioned embodiment, the present invention is not limited to this. For example, each of the movable pressing units may include one pressing member.

While the example in which the inclination adjusting mechanisms include the inclination adjusting pins has been shown in the aforementioned embodiment, the present invention is not limited to this. For example, the inclination adjusting mechanisms may include inclination adjusting structures such as inclination adjusting screws other than the inclination adjusting pins.

While the example in which two types of inclination adjusting mechanisms, which are the inclination adjusting mechanisms that adjust the inclinations of the pressing members in the plane parallel to the main surfaces of the blades, and the inclination adjusting mechanisms that adjust the inclinations of the pressing members in the plane perpendicular to the main surfaces of the blades, are provided has been shown in the aforementioned embodiment, the present invention is not limited to this.

In the present invention, only one of the inclination adjusting mechanisms that adjust the inclinations of the pressing members in the plane parallel to the main surfaces of the blades, and the inclination adjusting mechanisms that adjust the inclinations of the pressing members in the plane perpendicular to the main surfaces of the blades may be provided.

DESCRIPTION OF REFERENCE NUMERALS

1: substrate holding hand
2: arm
31: blade
31*a*: tip end
31*b*: base end
31*c*: main surface
32: first movable pressing unit (movable pressing unit)
32*a*, 33*a*: pressing member
33: second movable pressing unit (movable pressing unit)
34, 35, 36, 37: inclination adjusting mechanism
34*a*, 36*a*: inclination adjusting pin (first inclination adjusting pin)
35*a*, 37*a*: inclination adjusting pin (second inclination adjusting pin)
38: movable support unit
38*a*: support member
38*b*: mounting member
38*c*: fastening member
100: substrate conveying robot
311: front support (support)
312: rear support (support)
C1, C2, C3, C4: rotation axis
L1: centerline
W: substrate
Wa: outer peripheral edge of the substrate

The invention claimed is:

1. A substrate holding hand comprising:
a blade including a support to support a substrate;
a movable pressing unit including a pressing member that moves back and forth to press the substrate; and
an inclination adjusting mechanism operable to adjust an inclination of the pressing member,
wherein
the inclination adjusting mechanism is operable to adjust the inclination of the pressing member by rotating the pressing member about a predetermined rotation axis;
the inclination adjusting mechanism includes an inclination adjusting pin to support the pressing member such that the pressing member is rotatable about the predetermined rotation axis, and is operable to adjust the inclination of the pressing member by rotating the pressing member about the predetermined rotation axis with the inclination adjusting pin as a center of rotation;
the inclination adjusting pin includes a first inclination adjusting pin extending in a direction perpendicular to a main surface of the blade; and
the inclination adjusting mechanism is operable to adjust the inclination of the pressing member in a plane parallel to the main surface of the blade by rotating the pressing member about a rotation axis extending in the direction perpendicular to the main surface of the blade with the first inclination adjusting pin as the center of rotation.

2. The substrate holding hand according to claim 1, wherein
the pressing member includes a pair of pressing members;
the first inclination adjusting pin includes a pair of first inclination adjusting pins corresponding to the pair of pressing members; and
the inclination adjusting mechanism is operable to adjust inclinations of the pair of pressing members in the plane parallel to the main surface of the blade such that the pair of pressing members approach each other or move away from each other in the plane parallel to the main surface of the blade by rotating each of the pair of pressing members about the rotation axis extending in the direction perpendicular to the main surface of the blade with each of the pair of first inclination adjusting pins as the center of rotation.

3. The substrate holding hand according to claim 1, further comprising:
a movable support unit that moves back and forth to support the substrate; wherein the support includes a front support on a tip end side of the blade and a rear support on a base end side of the blade;
the movable support unit supports the substrate together with the front support; and
the movable pressing unit includes a first movable pressing unit to press the substrate supported by the front support and the movable support unit, and a second movable pressing unit to press the substrate supported by the front support and the rear support.

4. The substrate holding hand according to claim 1, wherein
the pressing member includes a pair of pressing members; and
the pair of pressing members are arranged at positions symmetrical with respect to a centerline extending in a direction in which the movable pressing unit moves back and forth, as viewed in a direction perpendicular to a main surface of the blade, and press the substrate at the positions symmetrical with respect to the centerline extending in the direction in which the movable pressing unit moves back and forth.

5. A substrate holding hand comprising:
a blade including a support to support a substrate;
a movable pressing unit including a pressing member that moves back and forth to press the substrate; and
an inclination adjusting mechanism operable to adjust an inclination of the pressing member,
wherein
the inclination adjusting mechanism is operable to adjust the inclination of the pressing member by rotating the pressing member about a predetermined rotation axis;
the inclination adjusting mechanism includes an inclination adjusting pin to support the pressing member such that the pressing member is rotatable about the predetermined rotation axis, and is operable to adjust the inclination of the pressing member by rotating the pressing member about the predetermined rotation axis with the inclination adjusting pin as a center of rotation;

the inclination adjusting pin includes a second inclination adjusting pin extending in a direction parallel to a main surface of the blade and perpendicular to a direction in which the movable pressing unit moves back and forth; and the inclination adjusting mechanism is operable to adjust the inclination of the pressing member in a plane perpendicular to the main surface of the blade by rotating the pressing member about a rotation axis extending in the direction parallel to the main surface of the blade and perpendicular to the direction in which the movable pressing unit moves back and forth with the second inclination adjusting pin as the center of rotation.

6. The substrate holding hand according to claim 5, wherein the blade includes a plurality of blades aligned in a direction perpendicular to the main surface of the blade;

the pressing member presses the substrate arranged on each of the plurality of blades in common; and the inclination adjusting mechanism is operable to adjust the inclination of the pressing member in the plane perpendicular to the main surface of the blade such that the inclination of the pressing member follows an inclination formed by an outer peripheral edge of each of a plurality of the substrates along the direction perpendicular to the main surface of the blade by rotating the pressing member about the rotation axis extending in the direction parallel to the main surface of the blade and perpendicular to the direction in which the movable pressing unit moves back and forth with the second inclination adjusting pin as the center of rotation.

7. A substrate holding hand comprising:

a blade including a support to support a substrate;

a movable pressing unit including a pressing member that moves back and forth to press the substrate;

an inclination adjusting mechanism operable to adjust an inclination of the pressing member; and a movable support unit including a support member that moves back and forth to support the substrate, wherein the support member includes a plurality of support members aligned in a direction perpendicular to a main surface of the blade to support a plurality of the substrates aligned in the direction perpendicular to the main surface of the blade;

among the plurality of support members of the movable support unit, an intermediate support member is replaceable while an end support member in the direction perpendicular to the main surface of the blade is attached;

the movable support unit further includes a plurality of mounting members to allow the support members to be mounted thereto;

the mounting member of the intermediate support member is fixed to the mounting member of the end support member by a fastening member; and the intermediate support member of the movable support unit is replaceable while the end support member is attached by removing the fastening member to remove the mounting member of the intermediate support member from the mounting member of the end support member.

* * * * *